M. Senior,

Journal Lubricator,

No. 2,964. Reissued June 2, 1868.

Witnesses:
Wm. Campbell
Geo. Schafer.

Inventor:
Mathew Senior,
(Assignor to
Barton H. Jenks)
by Munn, Fenwick & Lawrence

N. PETERS, PHOTO-LITHOGRAPHER, WASHINGTON, D. C.

United States Patent Office.

BARTON H. JENKS, OF BRIDESBURG, ASSIGNEE OF MATHEW SENIOR, OF FRANKFORD, PENNSYLVANIA.

*Letters Patent No.* 75,584, *dated March* 17, 1868; *reissue No.* 2,964, *dated June* 2, 1868.

IMPROVED LUBRICATING-DEVICE.

The Schedule referred to in these Letters Patent and making part of the same.

TO ALL WHOM IT MAY CONCERN:

Be it known that MATHEW SENIOR, of Frankford, in the county of Philadelphia, and State of Pennsylvania, did invent a new and improved Lubricating-Device, for which Letters Patent were granted to him on the 17th day of March, 1868; and whereas, by an assignment recorded in the United States Patent Office, March 23, 1868, the said MATHEW SENIOR did convey all the right, title, and interest in said Letters Patent to BARTON H. JENKS, of Bridesburg, in the county of Philadelphia, and State of Pennsylvania; now therefore, I, BARTON H. JENKS, do hereby declare that the following is a full, clear, and exact description of said invention, reference being had to the accompanying drawings, making a part of this specification, in which—

Figure 3 is a cross-section through the device, taken in the vertical plane indicated by red line *x x* in fig. 2.

Similar letters of reference indicate corresponding parts in the several figures.

Figure 1:
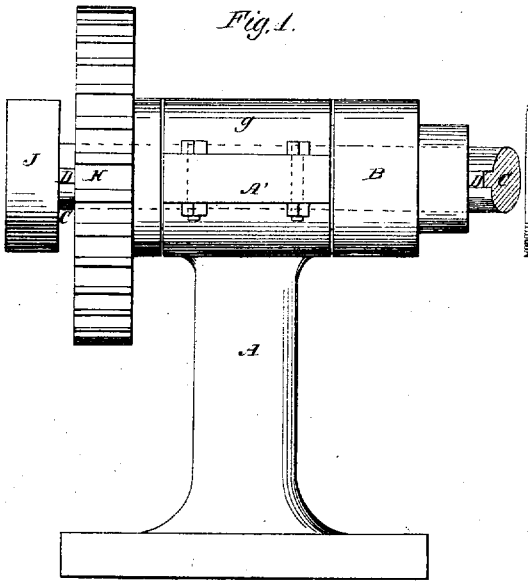
Figure 1 is a side view of the improved lubricating-device.

This invention relates to a new and improved method of lubricating a feathered shaft, which is designed to receive a rotary or oscillating motion, and also a longitudinal reciprocating motion.

It consists in supporting a feathered shaft in a journal-box, by means of a tubular journal or sleeve, which is allowed to move freely about its axis, and through which the feathered shaft passes, and is allowed to have an endwise movement, said tubular journal being suitably perforated, so that when oil is introduced through the journal-box, it will find its way to the feathered shaft through this journal, as will be hereinafter explained.

To enable others skilled in the art to understand this invention, I will describe one practical mode of carrying it into effect.

The stand A may be constructed in any well-known manner of making supports for the journal-boxes of shafting, and provided with a journal-box, A′, the removable cap *g* of which has an oil-passage, *f*, through it, through which oil is supplied to the circumference of a tubular journal or sleeve B. The journal B is represented in the drawings with enlargements *a a* upon its ends, which form shoulder-abutments for preventing this journal from receiving end-play in its box A′, and it is also represented with a spur-wheel, H, upon one end, by which motion can be communicated to it from a driver.

Through the centre of the tubular journal passes a shaft, C, which is designed to receive an endwise or longitudinal reciprocating motion, and also a rotary or oscillatory motion about its axis. The shaft C has a feather, D, upon it, which engages it with the tubular journal, so that this shaft will move with the journal when the latter is oscillated or rotated. The journal B has one or more openings, *e*, through it, which are intended to serve as feeders for supplying the surface of the shaft C and its feather D with oil which is received from the journal-box A′.

Figure 2:
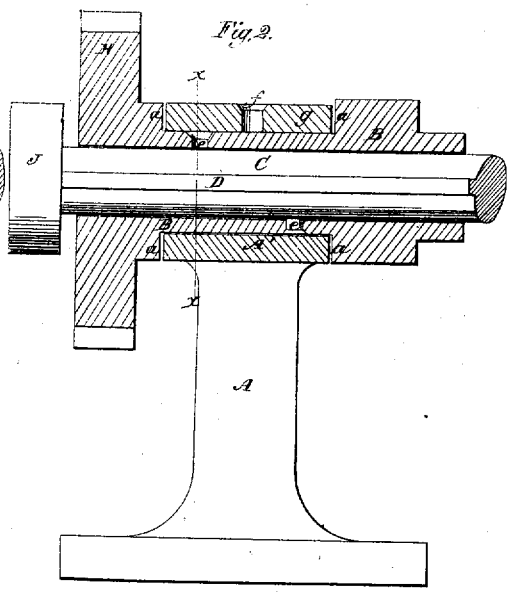
Figure 2 is a vertical longitudinal section, taken centrally through the device.
Figure 2:
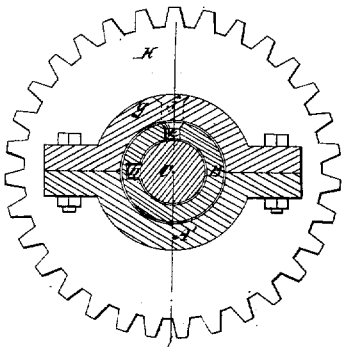

In fig. 2, two feeding-holes, *e e*, are shown arranged on opposite sides of the tubular journal B, and on both sides of the feed-hole *f*, which is through the cap of the journal-box. Thus it will be seen that the oil which is poured into the hole *f* will work from the centre or middle portion of the box A′ towards its ends, and lubricate the journal B, some of which oil will find its way through holes *e e*, to the shaft C, and lubricate this shaft also.

The device shown in the drawings, and above described, is particularly designed for condensing-machines, for which purpose the shaft C is provided on one end with a cylindrical enlargement, J, termed a rubber in the "improved rubber condenser."

In a condensing-machine, about fourteen of the feathered shafts are required, and under the old imperfect method of oiling them, the feathers are subject to very rapid wear.

By means of the device above described, the feathers, and indeed the entire surfaces of the shafts, can be properly lubricated, without any unnecessary waste of oil, with great facility, and in a neat and clean manner.

Having described the invention of MATHEW SENIOR, what I claim as new, and desire to secure by Letters Patent, is—

1. Lubricating a shaft which is required to receive endwise motion, and also motion about its axis, by means substantially as described.

2. The device for lubricating the feathered shaft C D from each side of the feather, through holes in the tubular journal B, and the hole *f* in the hollow cap *g*, as herein described.

3. The combination of the lubricating-device with a shaft which moves longitudinally independent of its sleeve, and turns with said sleeve, substantially as described.

Witnesses:

WILLIAM DOBSON,
JAMES HUGHES.

BARTON H. JENKS.